(12) United States Patent
Crabtree et al.

(10) Patent No.: US 12,537,858 B2
(45) Date of Patent: Jan. 27, 2026

(54) MODELING MULTI-PERIL CATASTROPHE USING A DISTRIBUTED SIMULATION ENGINE

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 155 days.

(21) Appl. No.: 18/595,449

(22) Filed: Mar. 5, 2024

(65) Prior Publication Data

US 2024/0205267 A1    Jun. 20, 2024

Related U.S. Application Data

(63) Continuation of application No. 17/185,655, filed on Feb. 25, 2021, now Pat. No. 12,225,049, which is a
(Continued)

(51) Int. Cl.
*H04L 9/40* (2022.01)
*G06F 9/50* (2006.01)
(Continued)

(52) U.S. Cl.
CPC ............ *H04L 63/20* (2013.01); *G06F 9/5038* (2013.01); *G06F 16/2477* (2019.01); *G06F 16/951* (2019.01); *H04L 63/1425* (2013.01); *H04L 63/1441* (2013.01); *G06F 9/4881* (2013.01); *G06F 9/54* (2013.01)

(58) Field of Classification Search
CPC . H04L 63/20; H04L 63/1425; H04L 63/1441; G06F 16/2477; G06F 16/951; G06F 9/5038
See application file for complete search history.

(56) References Cited

U.S. PATENT DOCUMENTS 7,072,863 B1    7/2006    Michael et al.
7,657,406 B2    2/2010    Tolone et al.
(Continued)

FOREIGN PATENT DOCUMENTS

WO    0163534 A2    8/2001

OTHER PUBLICATIONS

Romaniuk (Imprecise Approaches to Analysis of Insurance Portfolio with Catastrophe Bond, IPMU 2020, CCIS 1239, pp. 3-16, 2020.) (Year: 2020).*
(Continued)

*Primary Examiner* — Oleg Korsak
(74) *Attorney, Agent, or Firm* — Galvin Patent Law LLC; Brian R Galvin

(57) ABSTRACT

Modeling multi-peril catastrophe using a multidimensional timeseries data server that creates a first dataset by retrieving previously gathered and analyzed data based on a plurality of perils, and create a second dataset by retrieving from memory synthetically generated data based at least on the plurality of perils; and a directed computational graph service configured to retrieve the first dataset and second dataset from the multidimensional time series data server, and perform graph analysis on the first dataset and second dataset to find links amongst the plurality of perils.

13 Claims, 13 Drawing Sheets

Related U.S. Application Data continuation-in-part of application No. 17/035,029, filed on Sep. 28, 2020, now Pat. No. 11,546,380, which is a continuation-in-part of application No. 17/008,276, filed on Aug. 31, 2020, now Pat. No. 11,323,484, which is a continuation-in-part of application No. 17/000,504, filed on Aug. 24, 2020, now Pat. No. 11,477,245, which is a continuation-in-part of application No. 16/855,724, filed on Apr. 22, 2020, now Pat. No. 11,218,510, which is a continuation-in-part of application No. 16/836,717, filed on Mar. 31, 2020, now Pat. No. 10,917,428, and a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, said application No. 17/000,504 is a continuation-in-part of application No. 16/412,340, filed on May 14, 2019, now Pat. No. 11,539,663, which is a continuation-in-part of application No. 16/267,893, filed on Feb. 5, 2019, now abandoned, which is a continuation-in-part of application No. 16/248,133, filed on Jan. 15, 2019, now abandoned, said application No. 16/836,717 is a continuation-in-part of application No. 15/887,496, filed on Feb. 2, 2018, now Pat. No. 10,783,241, said application No. 16/248,133 is a continuation-in-part of application No. 15/849,901, filed on Dec. 21, 2017, now Pat. No. 11,023,284, which is a continuation-in-part of application No. 15/835,436, filed on Dec. 7, 2017, now Pat. No. 10,572,828, and a continuation-in-part of application No. 15/835,312, filed on Dec. 7, 2017, now Pat. No. 11,055,451, said application No. 16/720,383 is a continuation of application No. 15/823,363, filed on Nov. 27, 2017, now Pat. No. 10,560,483, said application No. 15/887,496 is a continuation-in-part of application No. 15/823,285, filed on Nov. 27, 2017, now Pat. No. 10,740,096, and a continuation-in-part of application No. 15/818,733, filed on Nov. 20, 2017, now Pat. No. 10,673,887, said application No. 16/248,133 is a continuation-in-part of application No. 15/813,097, filed on Nov. 14, 2017, now abandoned, and a continuation-in-part of application No. 15/806,697, filed on Nov. 8, 2017, now abandoned, said application No. 15/835,436 is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, said application No. 15/823,285 is a continuation-in-part of application No. 15/788,718, filed on Oct. 19, 2017, now Pat. No. 10,861,014, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, said application No. 15/818,733 is a continuation-in-part of application No. 15/725,274, filed on Oct. 4, 2017, now Pat. No. 10,609,079, said application No. 15/823,363 is a continuation-in-part of application No. 15/725,274, filed on Oct. 4, 2017, now Pat. No. 10,609,079, said application No. 16/248,133 is a continuation-in-part of application No. 15/673,368, filed on Aug. 9, 2017, now abandoned, said application No. 15/725,274 is a continuation-in-part of application No. 15/655,113, filed on Jul. 20, 2017, now Pat. No. 10,735,456, said application No. 15/813,097 is a continuation-in-part of application No. 15/616,427, filed on Jun. 7, 2017, now abandoned, said application No. 15/655,113 is a continuation-in-part of application No. 15/616,427, filed on Jun. 7, 2017, now abandoned, said application No. 15/790,327 is a continuation-in-part of application No. 15/616,427, filed on Jun. 7, 2017, now abandoned, said application No. 15/787,601 is a continuation-in-part of application No. 15/616,427, filed on Jun. 7, 2017, now abandoned, said application No. 15/673,368 is a continuation-in-part of application No. 15/376,657, filed on Dec. 13, 2016, now Pat. No. 10,402,906, said application No. 15/806,697 is a continuation-in-part of application No. 15/376,657, filed on Dec. 13, 2016, now Pat. No. 10,402,906, and a continuation-in-part of application No. 15/343,209, filed on Nov. 4, 2016, now Pat. No. 11,087,403, said application No. 15/376,657 is a continuation-in-part of application No. 15/237,625, filed on Aug. 15, 2016, now Pat. No. 10,248,910, said application No. 15/655,113 is a continuation-in-part of application No. 15/237,625, filed on Aug. 15, 2016, now Pat. No. 10,248,910, said application No. 15/343,209 is a continuation-in-part of application No. 15/237,625, filed on Aug. 15, 2016, now Pat. No. 10,248,910, and a continuation-in-part of application No. 15/229,476, filed on Aug. 5, 2016, now Pat. No. 10,454,791, said application No. 15/237,625 is a continuation-in-part of application No. 15/206,195, filed on Jul. 8, 2016, now abandoned, said application No. 15/229,476 is a continuation-in-part of application No. 15/206,195, filed on Jul. 8, 2016, now abandoned, which is a continuation-in-part of application No. 15/186,453, filed on Jun. 18, 2016, now abandoned, said application No. 15/835,312 is a continuation-in-part of application No. 15/186,453, filed on Jun. 18, 2016, now abandoned, which is a continuation-in-part of application No. 15/166,158, filed on May 26, 2016, now abandoned, said application No. 15/790,327 is a continuation-in-part of application No. 15/141,752, filed on Apr. 28, 2016, now Pat. No. 10,860,962, said application No. 15/166,158 is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, said application No. 15/616,427 is a continuation-in-part of application No. 14/925,974, filed on Oct. 28, 2015, now abandoned, said application No. 15/141,752 is a continuation-in-part of application No. 14/925,974, filed on Oct. 28, 2015, now abandoned.

(60) Provisional application No. 62/568,298, filed on Oct. 4, 2017, provisional application No. 62/568,312, filed on Oct. 4, 2017, provisional application No. 62/568,305, filed on Oct. 4, 2017, provisional application No. 62/568,291, filed on Oct. 4, 2017, provisional application No. 62/568,307, filed on Oct. 4, 2017.

(51) Int. Cl.
*G06F 16/2458* (2019.01)
*G06F 16/951* (2019.01)

G06F 9/48 (2006.01)
G06F 9/54 (2006.01)

(56) References Cited

U.S. PATENT DOCUMENTS

| | | |
|---|---|---|
| 7,698,213 B2 | 4/2010 | Lancaster |
| 7,818,224 B2 | 10/2010 | Boerner |
| 7,818,417 B2 | 10/2010 | Ginis et al. |
| 7,840,677 B2 | 11/2010 | Li et al. |
| 8,065,257 B2 | 11/2011 | Kuecuekyan |
| 8,069,190 B2 | 11/2011 | Mccoll et al. |
| 8,788,306 B2 | 7/2014 | Delurgio et al. |
| 9,338,061 B2 | 5/2016 | Chen et al. |
| 9,639,575 B2 | 5/2017 | Leida et al. |
| 10,168,691 B2 | 1/2019 | Zornio et al. |
| 10,210,246 B2 | 2/2019 | Stojanovic et al. |
| 10,740,358 B2 | 8/2020 | Chan et al. |
| 11,810,196 B1 | 11/2023 | Doyle et al. |
| 2013/0290554 A1 | 10/2013 | Chen et al. |
| 2016/0092557 A1 | 3/2016 | Stojanovic et al. |
| 2017/0006135 A1 | 1/2017 | Siebel et al. |
| 2017/0090893 A1 | 3/2017 | Aditya et al. |
| 2022/0058747 A1* | 2/2022 | Crabtree ................ G06Q 40/08 |

OTHER PUBLICATIONS

Calder et al., (Catastrophe Model Blending Techniques and Governance, The Actuarial Profession, 2012, 62 pages ) (Year: 2012).*
McGuinness, John S., Elements of Time-Series Analysis in Liability and Property Insurance Ratemaking, Time-Series, 202-254.
Network theory in risk assessment, Wikipedia, Mar. 26, 2020. 1-7, United States.

* cited by examiner

MODELING MULTI-PERIL CATASTROPHE USING A DISTRIBUTED SIMULATION ENGINE

CROSS-REFERENCE TO RELATED APPLICATIONS

Priority is claimed in the application data sheet to the following patents or patent applications, each of which is expressly incorporated herein by reference in its entirety:
Ser. No. 17/185,655
Ser. No. 17/035,029
Ser. No. 17/008,276
Ser. No. 17/000,504
Ser. No. 16/855,724
Ser. No. 16/836,717
Ser. No. 15/887,496
Ser. No. 15/823,285
Ser. No. 15/788,718
Ser. No. 15/788,002
Ser. No. 15/787,601
62/568,312
Ser. No. 15/616,427
Ser. No. 14/925,974
62/568,305
62/568,307
Ser. No. 15/818,733
Ser. No. 15/725,274
Ser. No. 15/655,113
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536
Ser. No. 16/777,270
Ser. No. 16/720,383
Ser. No. 15/823,363
Ser. No. 16/412,340
Ser. No. 16/267,893
Ser. No. 16/248,133
Ser. No. 15/849,901
Ser. No. 15/835,436
Ser. No. 15/790,457
Ser. No. 15/790,327
62/568,291
62/568,298
Ser. No. 15/835,312
Ser. No. 15/813,097
Ser. No. 15/806,697
Ser. No. 15/376,657
Ser. No. 15/343,209
Ser. No. 15/229,476
Ser. No. 15/673,368

BACKGROUND OF THE INVENTION

Field of the Invention

The disclosure relates to the field of catastrophe modeling, particularly to a catastrophe resulting from multiple linked perils.

Discussion of the State of the Art

Traditionally, modeling multi-peril events has proved to be a challenge. This may be a result of the unpredictive nature of such events. For instance, an event from one insured field may cause tremendous loss in another field which may have been initially perceived as being completely unrelated. This may be exasperated by a silent accumulation of risk. The history surrounding ASBESTOS and the resulting linked illnesses is often used as a prime example.

Another area lacking area is data available for analysis. Unlike modeling loss associated with property and other well-understood areas, which may have a wide range of forecast models available, multi-peril events may oftentimes not be repeated events, or black swan events. The lack of data available creates a challenge for accurately modeling the events.

What is needed is a system that provides a more comprehensive understanding of loss associated with multi-peril events. Such a system should be able to generate accurate datasets to further enrich areas in which data is lacking, as well as proactively evaluate new developments, whether real-world or regulations, to more accurately estimate loss associated with under-represented areas.

SUMMARY OF THE INVENTION

Accordingly, the inventor has conceived, and reduced to practice, a system and method for modeling multi-peril catastrophe using a distributed simulation engine.

In a typical embodiment, various models and sources of data, which may be generated or real-world data, may be used in conjunction to accurately model events that involve a chain reaction of multiple perils. The information may be used to more accurately forecast loss, as well as provide early warnings.

In one aspect of the invention, a system for modeling multi-peril catastrophe using a distributed simulation engine is provided, comprising a multidimensional timeseries data server comprising a memory, a processor, and a plurality of programming instructions stored in the memory thereof and operable on the processor thereof, wherein the programmable instructions, when operating on the processor, cause the processor to create a first dataset by retrieving from memory previously gathered and analyzed data based at least in part on a plurality of perils, and create a second dataset by retrieving from memory synthetically generated data based at least on the plurality of perils; and a directed computational graph service comprising a memory, a processor, and a plurality of programming instructions stored in the memory thereof and operable on the processor thereof, wherein the programmable instructions, when operating on the processor, cause the processor to retrieve the first dataset and second dataset from the multidimensional time series data server, and perform graph analysis on the first dataset and second dataset to find links amongst the plurality of perils.

In another embodiment of the invention, the system further comprises an automated planning service comprising a memory, a processor, and a plurality of programming instructions stored in the memory thereof and operable on the processor thereof, wherein the programmable instructions, when operating on the processor, cause the processor to forecast loss based at least in part by the first dataset, the second dataset, and links amongst the plurality of perils.

In another embodiment of the invention, at least a portion of the previously gathered and analyzed data is based on aggregated results of tessellated grid modeling. In another embodiment of the invention, at least a portion of the previously gathered and analyzed data is based on results of path-dependence modeling. In another embodiment of the invention, at least a portion of the previously gathered and analyzed data is based on results of dimensionality reduction analysis. In another embodiment of the invention, at least a portion of the previously gathered and analyzed data is based on results dynamic micro-peril modeling.

In another aspect of the invention, a method for modeling multi-peril catastrophe using a distributed simulation engine is provided, comprising the steps of: (a) creating a first dataset by retrieving from memory previously gathered and analyzed data based at least in part on a plurality of perils, using a multidimensional timeseries data server; (b) create a second dataset by retrieving from memory synthetically generated data based at least on the plurality of perils, using the multidimensional timeseries data server; (c) retrieving the first dataset and second dataset from the multidimensional time series data server, using a directed computational graph service; and (d) perform graph analysis on the first dataset and second dataset to find links amongst the plurality of perils, using the directed computational graph service.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE DRAWING FIGURES

Figure 1:
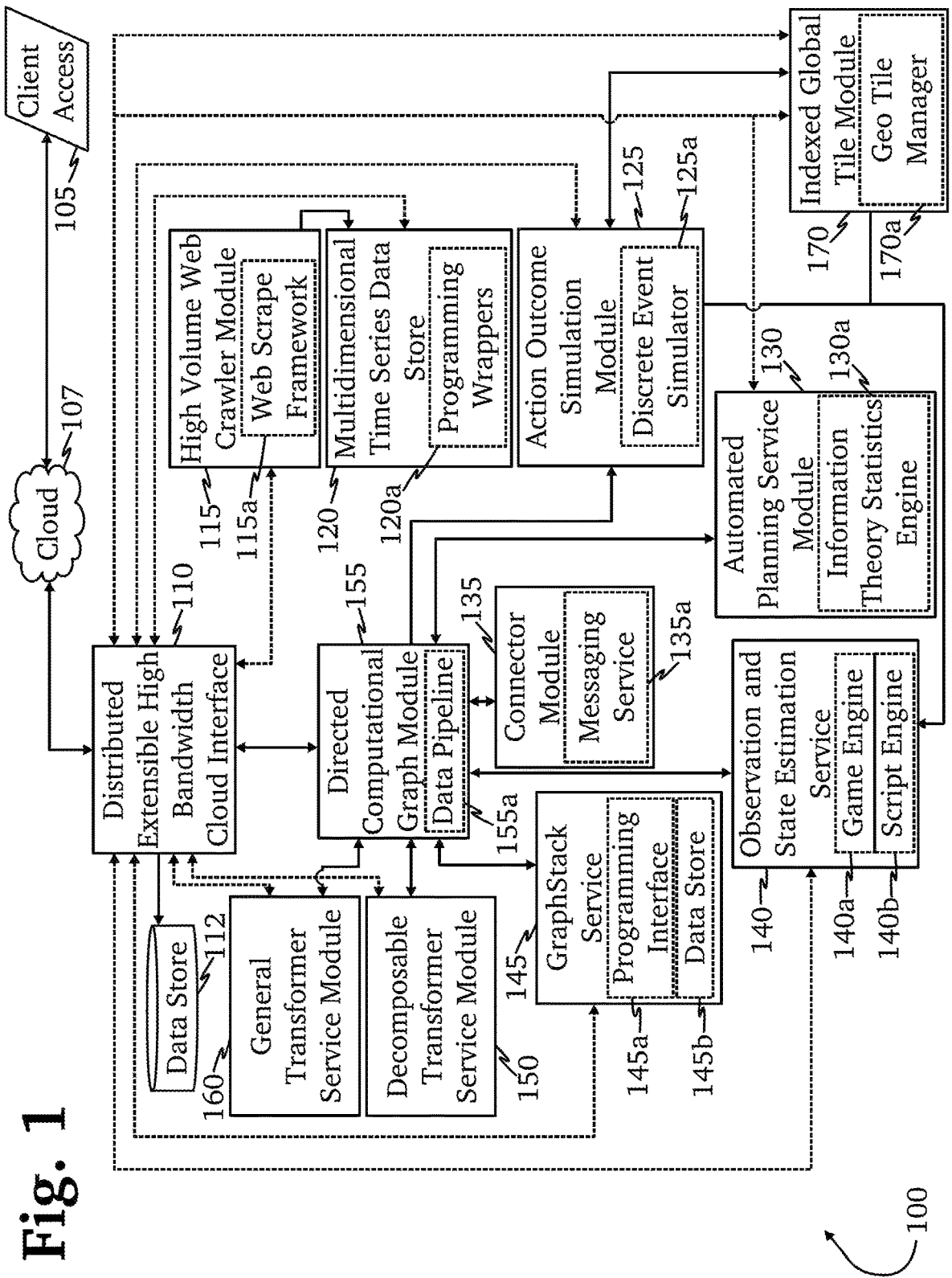
FIG. 1 is a diagram of an exemplary architecture of a business operating system according to an embodiment of the invention.

The inventor has conceived, and reduced to practice, a system and method for modeling multi-peril catastrophe using a distributed simulation engine.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a diagram of an exemplary architecture of a business operating system 100 according to an embodiment of the invention. Client access to system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources 107, public or proprietary such as, but not limited to: subscribed business field specific data services, external remote sensors, subscribed satellite image and data feeds and web sites of interest to business operations both general and field specific, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and a graph stack service 145. Directed computational graph module 155 retrieves one or more streams of data from a plurality of sources, which includes, but is not limited to, a plurality of physical sensors, network service providers, web based questionnaires and surveys, monitoring of electronic infrastructure, crowd sourcing campaigns, and human input device information. Within directed computational graph module 155, data may be split into two identical streams in a specialized pre-programmed data pipeline 155a, wherein one sub-stream may be sent for batch processing and storage while the other sub-stream may be reformatted for transformation pipeline analysis. The data may be then transferred to a general transformer service module 160 for linear data transformation as part of analysis or the decomposable transformer service module 150 for branching or iterative transformations that are part of analysis. Directed computational graph module 155 represents all data as directed graphs where the transformations are nodes and the result messages between transformations edges of the graph. High-volume web crawling module 115 may use multiple server hosted preprogrammed web spiders which, while autonomously configured, may be deployed within a web scraping framework 115a of which SCRAPY™ is an example, to identify and retrieve data of interest from web based sources that are not well tagged by conventional web crawling technology. Multiple dimension time series data store module 120 may receive streaming data from a large plurality of sensors that may be of several different types. Multiple dimension time series data store module 120 may also store any time series data encountered by system 100 such as, but not limited to, environmental factors at insured client infrastructure sites, component sensor readings and system logs of some or all insured client equipment, weather and catastrophic event reports for regions an insured client occupies, political communiques and/or news from regions hosting insured client infrastructure and network service information captures (such as, but not limited to, news, capital funding opportunities and financial feeds, and sales, market condition), and service related customer data. Multiple dimension time series data store module 120 may accommodate irregular and high-volume surges by dynamically allotting network bandwidth and server processing channels to process the incoming data. Inclusion of programming wrappers 120a for languages—examples of which may include, but are not limited to, C++, PERL, PYTHON, and ERLANG™—allows sophisticated programming logic to be added to default functions of multidimensional time series database 120 without intimate knowledge of the core programming, greatly extending breadth of function. Data retrieved by multidimensional time series database 120 and high-volume web crawling module 115 may be further analyzed and transformed into task-optimized results by directed computational graph 155 and associated general transformer service 160 and decomposable transformer service 150 modules. Alternately, data from the multidimensional time series database and high-volume web crawling modules may be sent, often with scripted cuing information determining important vertices 145a, to graph stack service module 145 which, employing standardized protocols for converting streams of information into graph representations of that data, for example open graph internet technology (although the invention is not reliant on any one standard). Through the steps, graph stack service module 145 represents data in graphical form influenced by any pre-determined scripted modifications 145a and stores it in a graph-based data store 145b such as GIRAPH™ or a key-value pair type data store REDIS™, or RIAK™, among others, any of which are suitable for storing graph-based information.

Results of the transformative analysis process may then be combined with further client directives, additional business rules and practices relevant to the analysis and situational information external to the data already available in automated planning service module 130, which also runs powerful information theory-based predictive statistics functions and machine learning algorithms 130*a* to allow future trends and outcomes to be rapidly forecast based upon the current system derived results and choosing each a plurality of possible business decisions. Then, using all or most available data, automated planning service module 130 may propose business decisions most likely to result in favorable business outcomes with a usably high level of certainty. Closely related to the automated planning service module 130 in the use of system-derived results in conjunction with possible externally supplied additional information in the assistance of end user business decision making, action outcome simulation module 125 with a discrete event simulator programming module 125*a* coupled with an end user-facing observation and state estimation service 140, which is highly scriptable 140*b* as circumstances require and has a game engine 140*a* to more realistically stage possible outcomes of business decisions under consideration, allows business decision makers to investigate the probable outcomes of choosing one pending course of action over another based upon analysis of the current available data.

A significant proportion of the data that is retrieved and transformed by the business operating system, both in real world analyses and as predictive simulations that build upon intelligent extrapolations of real world data, may include a geospatial component. The indexed global tile module 170 and its associated geo tile manager 170*a* may manage externally available, standardized geospatial tiles and may enable other components of the business operating system, through programming methods, to access and manipulate meta-information associated with geospatial tiles and stored by the system. The business operating system may manipulate this component over the time frame of an analysis and potentially beyond such that, in addition to other discriminators, the data is also tagged, or indexed, with their coordinates of origin on the globe. This may allow the system to better integrate and store analysis specific information with all available information within the same geographical region. Such ability makes possible not only another layer of transformative capability, but may greatly augment presentation of data by anchoring to geographic images including satellite imagery and superimposed maps both during presentation of real world data and simulation runs.

Figure 2:
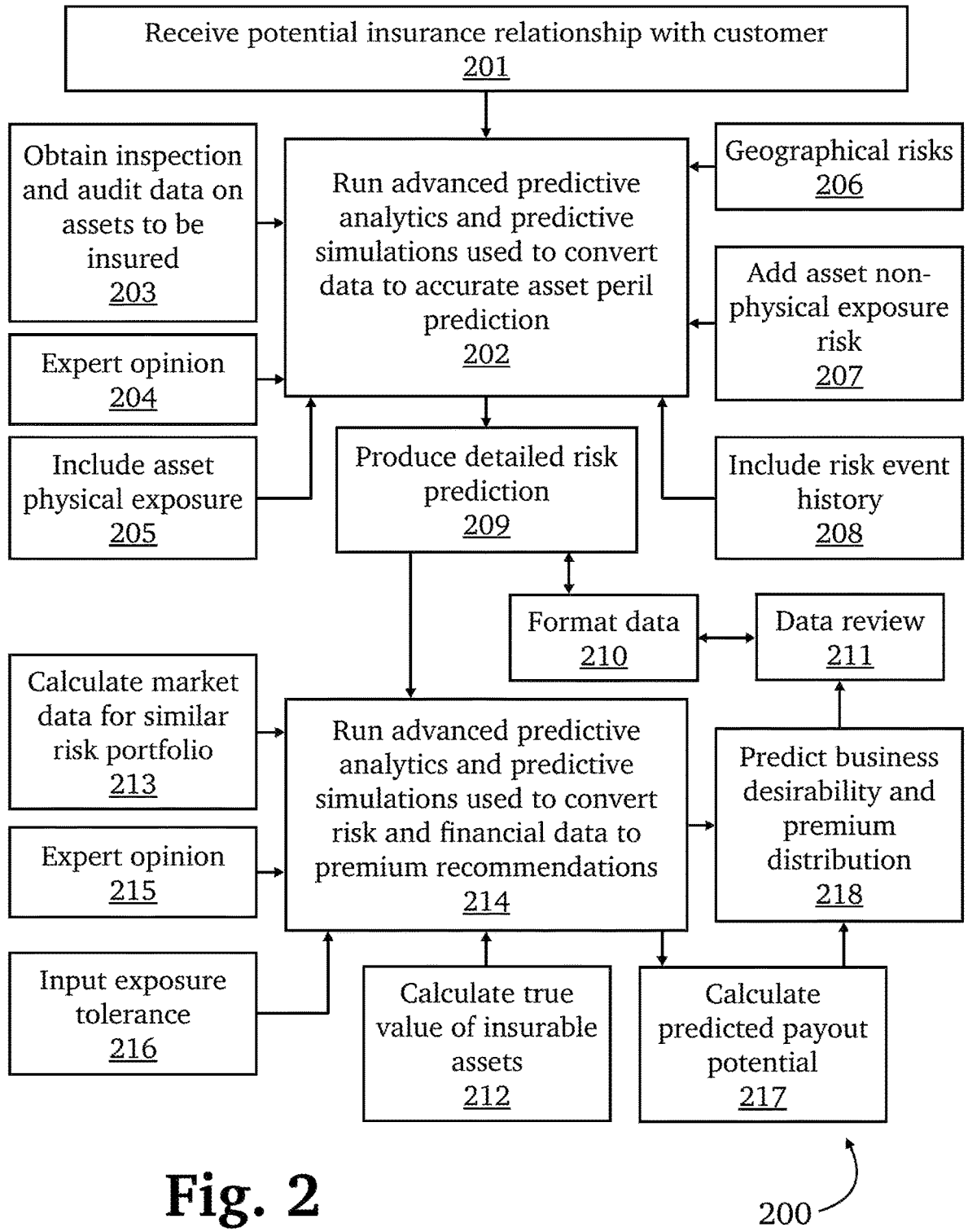
FIG. 2 is a flow diagram of an exemplary function of the business operating system in the calculation of asset hazard and risk in relationship to premium fixation.

FIG. 2 is a flow diagram of an exemplary function 200 of the business operating system in the calculation of asset hazard and risk in relationship to premium fixation. In an embodiment, the prospect of a new insurance customer is presented at step 201. Several pieces of data combine to produce an insurance relationship that optimally serves both customer and insurer. All of this data must be cleanly analyzed not only individually but also as a whole, combined in multiple permutations and with the ability to uncover hard to foresee relationships and future possible pitfalls. The business operating system 100 previously disclosed in co-pending application Ser. No. 15/141,752 and applied in a role of cybersecurity in co-pending application Ser. No. 15/237,625, when programmed to operate as an insurance decision platform, is very well suited to perform advanced predictive analytics and predictive simulations to produce risk predictions needed required by actuaries and underwriters to generate accurate tables for later pricing at step 202. Data forming the basis of these calculations may be drawn from a set comprising at least: inspection and audit data on the condition and worth of the customer's equipment and infrastructure to be insured at step 203; known and probable physical risks to customer's assets such as but not limited to: flooding, volcanic eruption, wildfires, tornado activity, hurricane or typhoon, earthquake among other similar dangers known to those skilled in the art at step 205; non-physical risks to customer's assets which may include, but are not limited to: electronic or cyberattack, and defective operating software as well as other similar risks known to those skilled in the field at step 207; and geographical risks, which may include but are not limited to: political and economic unrest, crime rates, government actions, and escalation of regional tensions at step 206. Also of great importance may be the actual history of risk events at step 208 occurring at or near the sites of a customer's assets as such data provides at least some insight into the occurrence and regularity of possible payout requiring events to be analyzed prior to policy generation. For the most complete and thereby accurate use of predictive analytics and predictive simulation, the possibility to add expert opinion and experience at step 204 to the body of data should be available. Important insights into aspects of a potential client may not be present or gleaned by the analysis of the other available data. An observation made by an insurer's expert during the process, even if seemingly minor, may, when analyzed with other available data, give rise to additional queries that must be pursued or significantly change the predictive risk recommendations produced at step 209 by the insurance decision platform during step 202.

The generation of detailed risk prediction data during step 209, which may have granularity to every unit of equipment possessed and each structure as well as support land and services of each area of infrastructure as would be known to those skilled in the field, is of great value on its own and its display at step 211, possibly in several presentation formats prepared at step 210 for different insurer groups may be needed, for example as a strong basis for the work of actuaries and underwriters to derive risk cost tables and guides, among multiple other groups who may be known to those skilled in the field. Once expert risk-cost data is determined, it may be input at step 211, system formatted and cleaned at step 210 and added to the system generated risk prediction data, along with contributions by other insurer employed groups to the data to be used in predictive calculation of business desirability of insuring the new venture and premium recommendations in steps 214 and 218. Some factors that may be retrieved and employed by the system here are: to gather available market data for similar risk portfolios as pricing and insurer financial impact guidelines at step 213; all available data for all equipment and infrastructure to be insured may also be reanalyzed for accuracy, especially for replacement values which may fluctuate greatly and need to be adjusted intelligently to reflect that at step 212; the probabilities of multiple disaster payouts or cascading payouts between linked sites as well as other rare events or very rare events must be either predicted or explored and accounted for at step 217; an honest assessment of insurer company risk exposure tolerance as it is related to the possible customer's specific variables must be considered for intelligent predictive recommendations to be made at step 216; also potential payout capital sources for the new venture must be investigated be they traditional in nature or alternative such as, but not limited to insurance linked security funds at step 219; again, the possibility of expert opinion data should be available to the system at step

215 during analysis and prediction of business desirability recommendations and premiums changed at step 218. All recommendations may be formatted at step 210 for specific groups within the insurer company and possibly portions for the perspective client and displayed for review at step 211.

While all descriptions above present use of the insurance decision platform for new clients, the majority of the above process is also applicable to such tasks as policy renewals or expansions.

Figure 3:
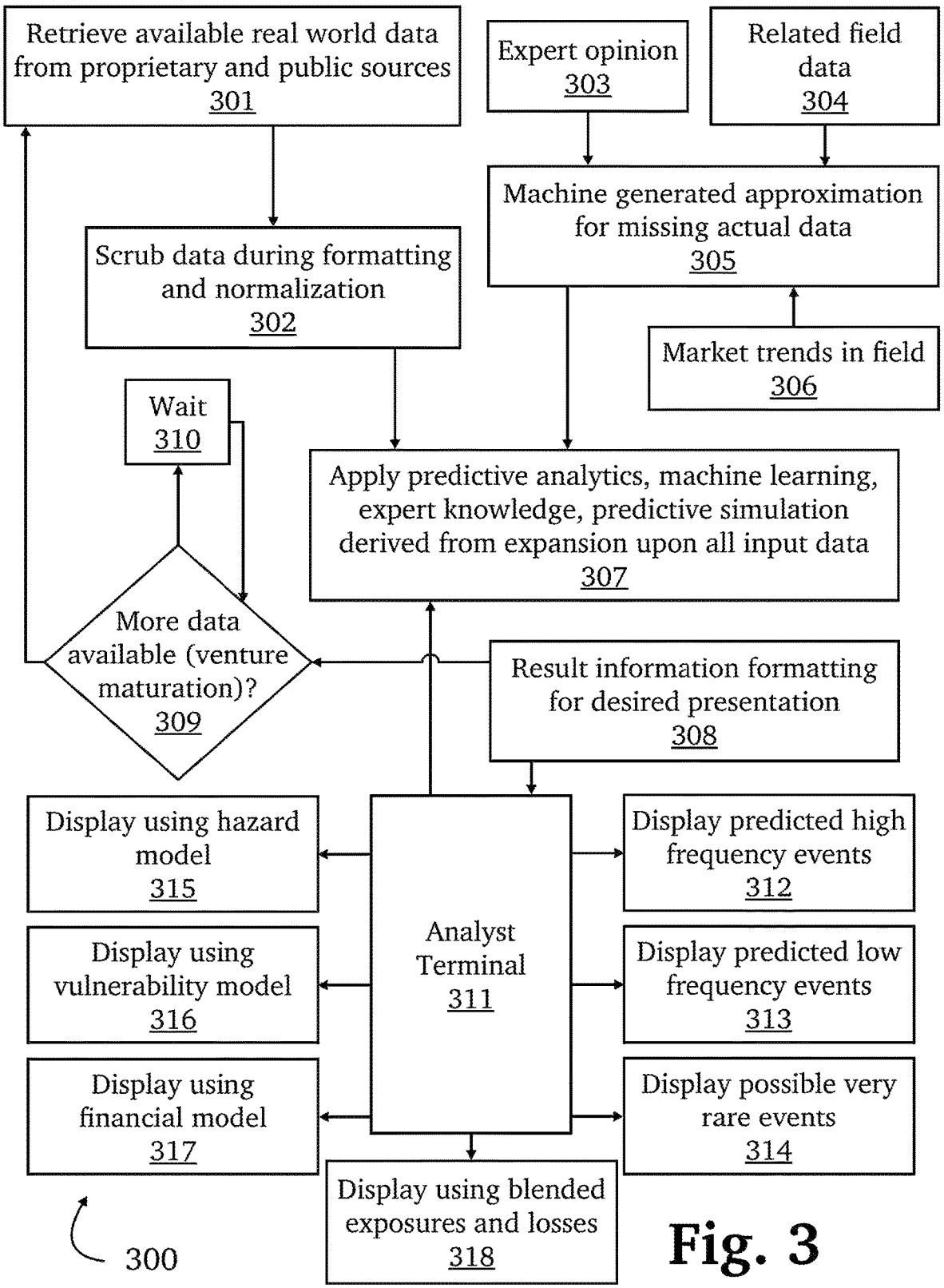
FIG. 3 is a process diagram showing business operating system functions in use to present comprehensive data and estimate driven predictive recommendations in emerging insurance markets using several possible presentation model formats.

FIG. 3 is a process diagram showing business operating system functions 300 in use to present comprehensive data and estimate driven predictive recommendations in emerging insurance markets using several possible presentation model formats. New insurance markets are continuously arising and the ability to profitably participate is of great importance. An embodiment of the invention analyzes insurance related data and recommends insurance decisions may greatly assist in development of a profitable pathway in new insurance opportunities. Retrieval or input of any prospective new field related data from a plurality of both public and available private or proprietary sources acts to seed the process at step 301, specific modules of the system such as the connector module 135 with its programmable messaging service 135*a*, the High volume web crawler 115 and the directed computational graph module 155, among possible others act to scrub format and normalize data at step 302 from many sources for use. In new fields of possible insurance venture, many pieces of data necessary and useful for the arrival at reliable and informed decision are absent. Some of this can be circumvented by the presence of expert opinion from insurer's employees and outside consultants who may work in the field targeted by the venture at step 303 much of the rest of the information must be predictively synthesized using such sources as data available from insurance ventures in related fields at step 304, and market trends in the field at step 306 among other factors known to those skilled in the field and reliable approximations by the system based upon these factors at step 305. Actual data and estimates when combined may be further combined and predictively transformed by the insurance decision platform at step 307 to produce the most reliable model and recommendations possible to be considered by decision makers at the insurer such as actuaries, underwriters, financial officers and brokers to decide on the best path forward at step 308 without each of them having to have found and processed the data themselves which may have led to omissions and errors. Also, if the venture is pursued, the system may continuously monitor all resulting data such that the model may be continuously improved by re-running steps 309, 310, and 301; and both insurer profitability and insurance coverage for the client are best optimized. Results may be formatted for display and manipulation in several different ways via an analyst terminal at step 311, a few of which include a hazard model at step 315 which defines arbitrary characteristics of potential disasters or loss-initiating events and their frequency, location and severity using analytics or modeling simulation. In this display model, single-event characteristics are enhanced with event-set generation tools. A vulnerability model at step 316 which specify the response of insured assets and areas of interest based on the magnitude of experienced events. This display model blends expert opinion with empirical data and extracted models and can be re-configured to accommodate custom weightings. A financial model at step 317 which takes into account financial impact across all monitored assets and scenarios with each platform convolution while also considering portfolio-level losses and distributions. This model provides data optimized for making informed business decisions using an expected probability curve and promotes consideration of tools such as the tail value-at-risk to understand exposures to large single-event losses. Finally, a blended exposures and losses model at step 318 which operates under the knowledge that risks that may result in numerous losses concentrated in space and time are especially challenging. The strong correlation between inland flooding, storm surge and wind damage from hurricanes is a canonical example. This model optimizes the result data for display of multi-peril analysis to improve product development and introduction while balancing concerns related to correlated risk accumulation via modeling and named-peril risk transfer—even on all peril or multi-peril primary insurance products.

In addition to displaying the specifics of a new venture under the differential illumination of the above display models, asset peril may be visualized by predicted occurrence probabilities which range from "high frequency events" at step 312 which are usually of low and estimable severity per single event, low in peril risk, which is most easily calculated, has an estimable frequency when analytics are used and may follow a Gaussian type 1 distribution; to "low frequency events" at step 313 which may be of high severity per single event engenders a catastrophic event risk which is calculable and may be at least partially mitigatable, is difficult to estimate in frequency and thus may require both predictive analytic and simulation transformation to determine and follows a type 2 fat-tailed power law distribution; and last events that must be classified as "very rare" at step 314 which may be extremely severe if they occur possibly forecast by simulation, have an "existential" risk factor which is calculable only in terms of the impact of the event and may only be roughly estimable by input expert judgement, frequency cannot be forecast. Of course display of venture specific events of predicted as "high frequency" and "low frequency" are most likely whereas display of machine simulated "very rare" events are of value to spark further exploration and discussion.

Figure 4:
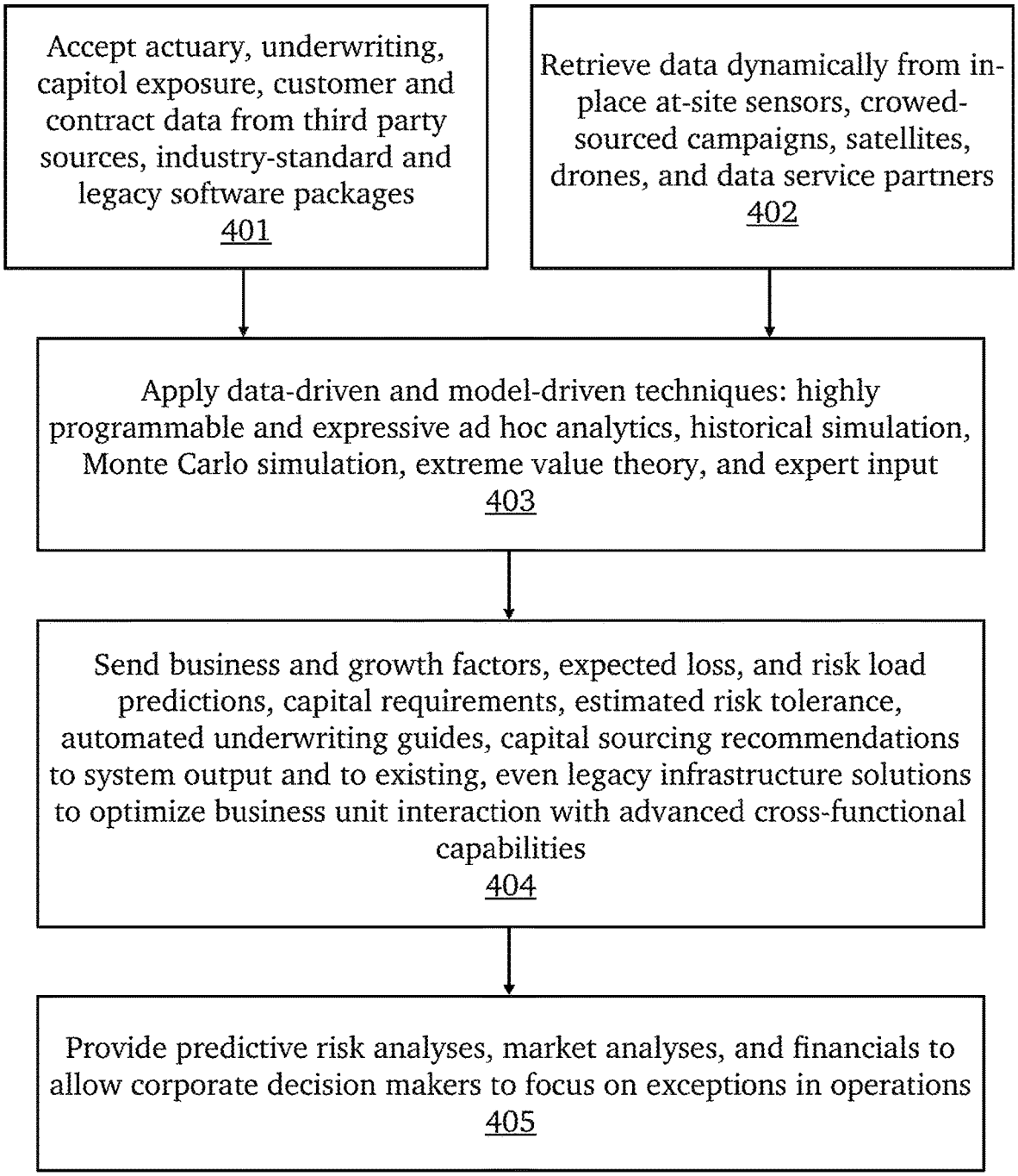
FIG. 4 is a process flow diagram of a possible role in a more generalized insurance workflow as per one embodiment of the invention.

FIG. 4 is a process flow diagram of a possible role in a more generalized insurance workflow 400 as per one embodiment of the invention. It is important that any added computational capability, such as the SaaS insurance decision platform, integrate with the majority, if not all of an insurer's existing workflow while opening the business to new sources of information and predictive capabilities. With its programmable connector module 135 and messaging center 135*a*, the insurance decision platform 100 is pre-designed to retrieve and transform data from the APIs of virtually all industry standard software packages and can be programmed to retrieve information from other legacy or obscure sources as needed, as an example, data may even be entered as csv and transformed, as a simplistic choice from the many possible formats known to one skilled in the art and for which the platform is capable to handle at step 401. Of greatly added value, the platform may allow the client insurer to receive data dynamically from in-place at site sensors at insurance client sites or in various areas of interest at step 402 due to the multidimensional time series 120 data store which can be programmed to interpret and correctly normalize many data streams 120*a*. Feeds from crowd sourced campaigns, satellites, drones, sources which may not have been available to the insurer client in the past can also be used as information sources as can a plurality of insurance related data, both on the general web and from data service providers may also add to the full complement of data the insurer client can use for decision making. To reliably and usefully process all of this data which can quickly overwhelm even a team dedicated to accumulation and cleansing, the platform may transform and analyze the data with model and data driven algorithms which include but are not limited to ad hoc analytics, historical simulation, Monte Carlo simulation, extreme value theory and processes augmented by insurance expert input at step 403 as well as other techniques known to be useful in these circumstances by those knowledgeable in the art, for which the platform is highly, expressively programmable. The output of system generated analyses and simulations such as estimated risk tolerances, underwriting guides, capital sourcing recommendations among many others known to those knowledgeable in the art may then be sent directly to dedicated displays or formatted by the connector module 135 and distributed to existing or legacy infrastructure solutions to optimize business unit interaction with new, advanced cross functional decision recommendations at step 404. The end result is that decision makers can focus on creative production and exception-based event management rather than simplistic data collection, cleansing, and correlation tasks at step 405.

Figure 5:
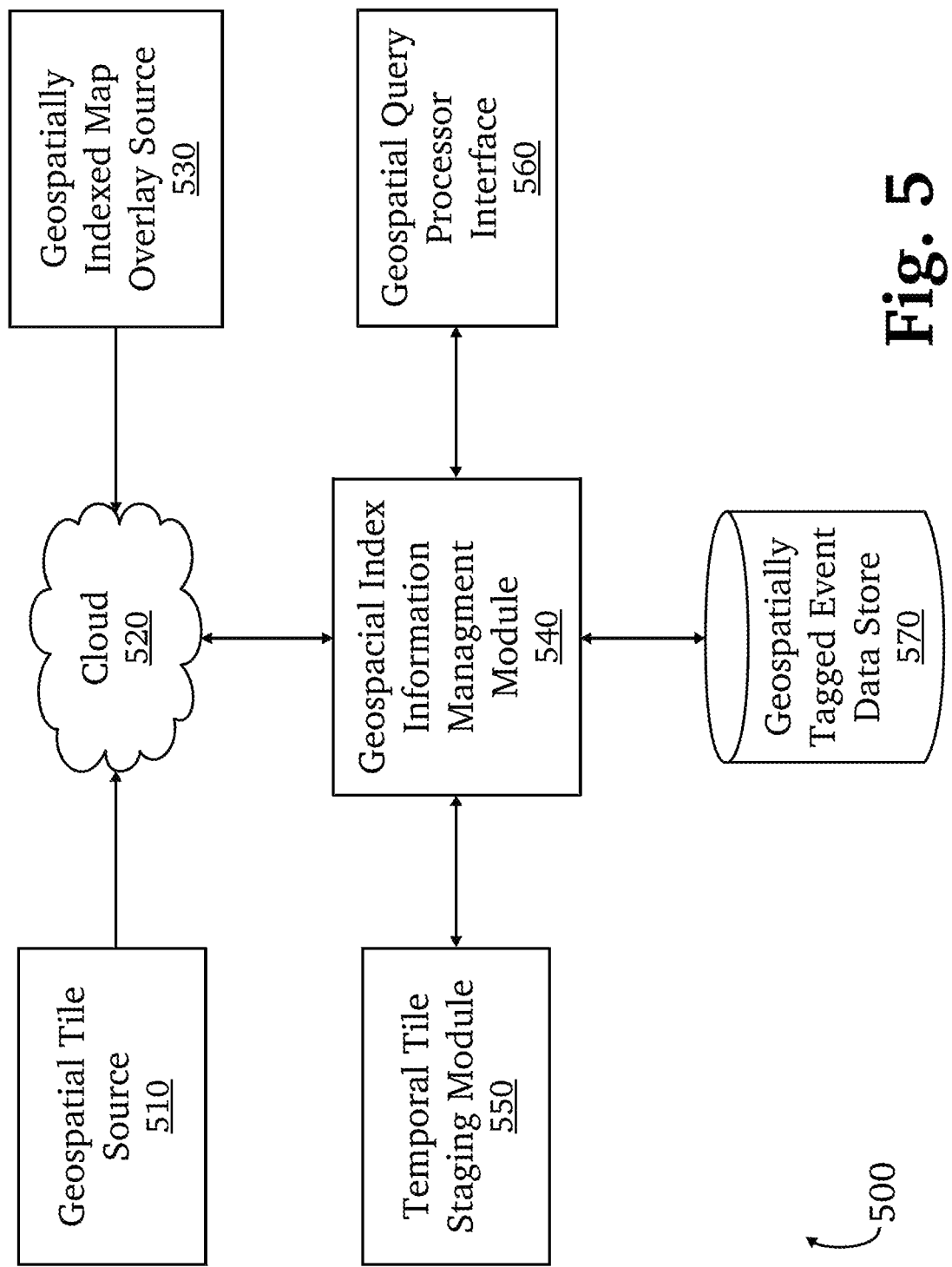
FIG. 5 is a diagram of an indexed global tile module as per one embodiment of the invention.

FIG. 5 is a diagram of an indexed global tile module 500 as per one embodiment of the invention. A significant amount of the data transformed and simulated by the business operating system has an important geospatial component. Indexed global tile module 170 allows both for the geo-tagging storage of data as retrieved by the system as a whole and for the manipulation and display of data using its geological data to augment the data's usefulness in transformation, for example creating ties between two independently acquired data points to more fully explain a phenomenon; or in the display of real world, or simulated results in their correct geospatial context for greatly increased visual comprehension and memorability. Indexed global tile module 170 may consist of a geospatial index information management module which retrieves indexed geospatial tiles from a cloud-based source 510, 520 known to those skilled in the art, and may also retrieve available geospatially indexed map overlays from a geospatially indexed map overlay source 530 known to those skilled in the art. Tiles and their overlays, once retrieved, represent large amounts of potentially reusable data and are therefore stored for a pre-determined amount of time to allow rapid recall during one or more analyses on a temporal staging module 550. To be useful, it may be required that both the transformative modules of the business operating system, such as, but not limited to directed computational graph module 155, automated planning service module 130, action outcome simulation module 125, and observational and state estimation service 140 be capable of both accessing and manipulating the retrieved tiles and overlays. A geospatial query processor interface 560 serves as a program interface between these system modules and geospatial index information management module 540 which fulfills the resource requests through specialized direct tile manipulation protocols, which for simplistic example may include "get tile xxx," "zoom," "rotate," "crop," "shape," "stitch," and "highlight" just to name a very few options known to those skilled in the field. During analysis, the geospatial index information management module may control the assignment of geospatial data and the running transforming functions to one or more swimlanes to expedite timely completion and correct storage of the resultant data with associated geotags. The transformed tiles with all associated transformation tagging may be stored in a geospatially tagged event data store 570 for future review. Alternatively, just the geotagged transformation data or geotagged tile views may be stored for future retrieval of the actual tile and review depending on the need and circumstance. There may also be occasions where time series data from specific geographical locations are stored in multidimensional time series data store 120 with geo-tags provided by geospatial index information management module 540.

Figure 6:
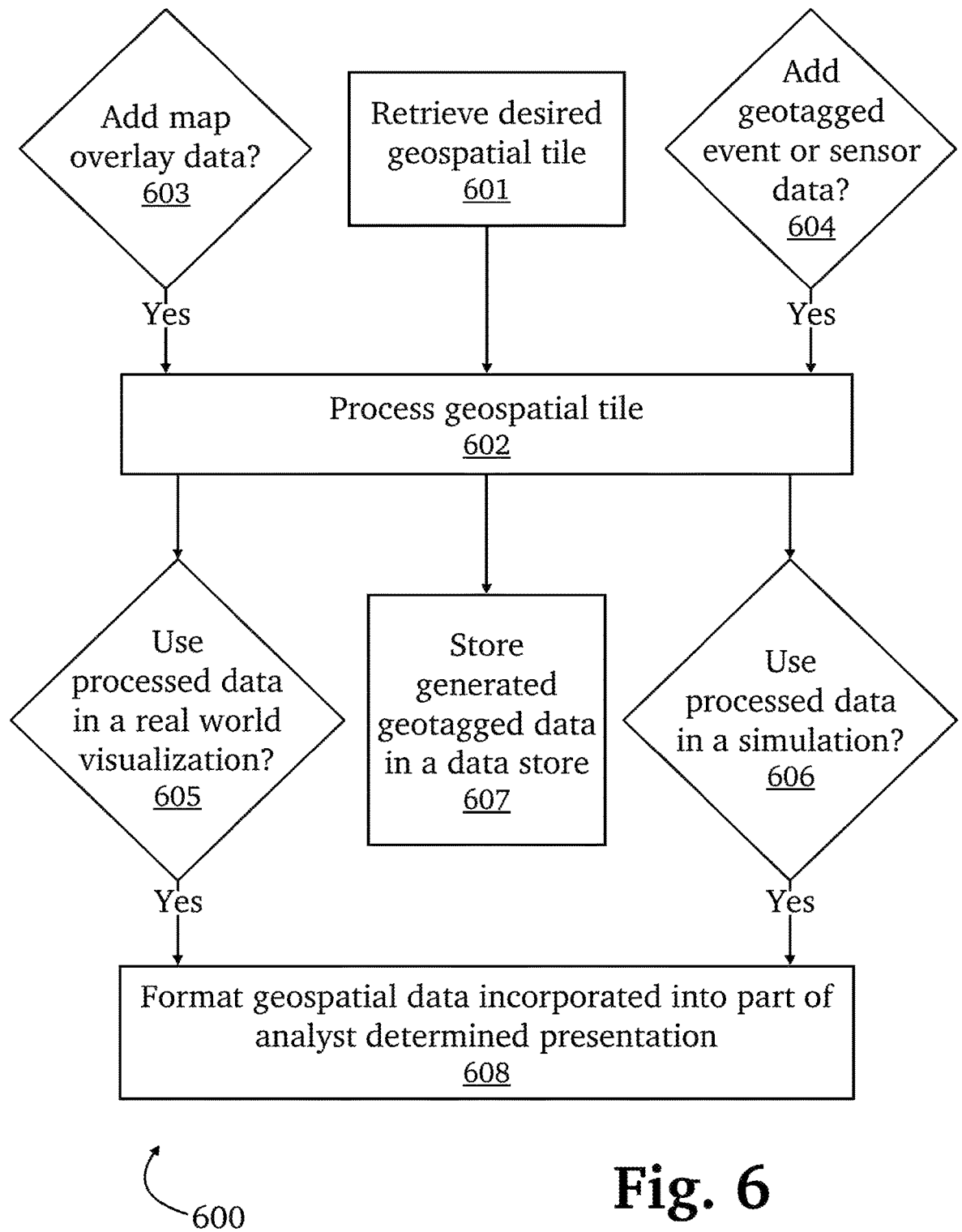
FIG. 6 is a flow diagram illustrating the function of the indexed global tile module as per one embodiment of the invention.

FIG. 6 is a flow diagram illustrating the function 600 of the indexed global tile module as per one embodiment of the invention. Predesignated, indexed geospatial tiles are retrieved from sources known to those skilled in the art at step 601. Available map overlay data, retrieved from one of multiple sources at step 603 known to those skilled in the art may be retrieved per user design. The geospatial tiles may then be processed in one or more of a plurality of ways according to the design of the running analysis at step 602, at which time geo-tagged event or sensor data may be associated with the indexed tile at step 604. Data relating to tile processing, which may include the tile itself is then stored for later review or analysis at step 607. The geo-data, in part, or in its entirety may be used in one or more transformations that are part of a real-world data presentation at step 605. The geo-data in part or in its entirety may be used in one or more transformations that are part of a simulation at step 606. At least some of the geospatial data may be used in an analyst determined direct visual presentation or may be formatted and transmitted for use in third party solutions at step 608.

Figure 7:
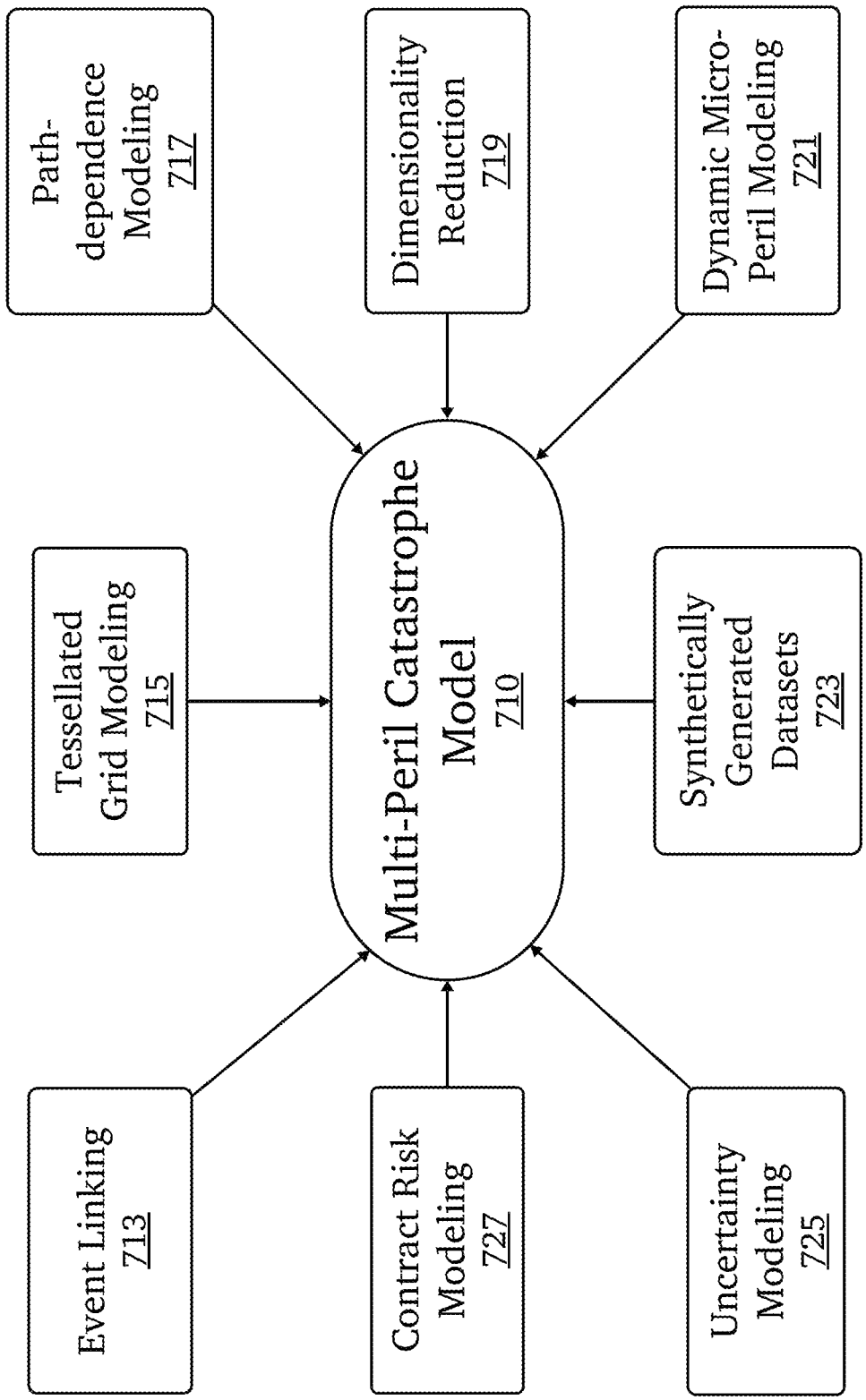
FIG. 7 is a block diagram of a system comprising various elements that may go into building a multi-peril catastrophe model as used in various embodiments of the invention.

With the use of the advanced risk quantification techniques discussed above, and the advanced simulation tools provided by business operating system 100, a better understanding of a multi-peril event may be achieved. FIG. 7 is a block diagram of a system 700 comprising various elements that may go into building a multi-peril catastrophe model as used in various embodiments of the invention. System 700 may comprise event linking data 713, tessellated grid modeling 715, path-dependency modeling 717, dimensionality reduction 719, dynamic micro-peril modeling 721, synthetically generated datasets 723, uncertainty sampling 725, and contract risk modeling 727. By combining some or all of the elements listed, a comprehensive multi-peril catastrophe model 710 may be created, and used to accurately model and forecast a multi-peril catastrophe.

Event linking 713 may entail the use of graph stack service 145 and multidimensional time series data server 120 to process real-world data and synthetically generated data 723 to determine how various events may be linked. As a simple example, a hurricane may be linked to flooding which may, in turn, be linked to property damage. However, with the use of the advanced simulation and modeling functions of business operating system 100, less obvious links may be discovered, which may have been overlooked using traditional methods.

Multidimensional time series data server 120 also provides advanced tools for temporal analysis which may allow the construction of detailed timelines. This allows for gathering of additional data with regards to seasonal occurrences, as well as global cycles with far less frequent occurrences, for instance events relating to the El Nino Southern Oscillation.

Tessellated grid modeling 715 may entail of the use of global tile tools 170 provided by business operating system 100 to dynamically generate, process, and analyze a plurality of hexagonal grid layers, where each layer may be associated with a separate peril or may be a combination of perils. Each cell in each grid layer may be populated with data pertaining to the peril associated to that layer, such as population density, forecasted loss in the event of the particular peril, hazards, vulnerabilities, and the like. The data may be based on real-world data or synthetically generated datasets 723, and may also be used to generate event sets or models on a cell-by-cell basis.

Layer conflation may be used to aggregate the data in two or more layers to analyze a peril of interest. Different perils may factor into the combined layer at varying degrees depending on how strongly linked it is to the peril of interest. In the case of an ongoing event, newly observed or generated data may be used to dynamically adjust how each peril is factored into the aggregated layer, thereby allowing dynamic tuning of the forecast models.

The use of a hexagonal grid may be preferable over a square due to the consistency of area contained in each cell. However, it should be appreciated that the use other cell shapes may be used, for example, squares, rectangles, diamonds, triangles, and the like.

Path-dependency modeling 717 may entail the use of a tree data structure to represent a path of events with regards to a peril, or it may be used as an assessment of a multi-peril event. In this embodiment, Monte Carlo tree search (MCTS) may be used to search and determine event paths of with a specific metrics; for example, to search for a worst-case or a best-case scenario path, both of which may be useful for more accurate modeling of loss and capital. In the case of an ongoing event, additional data may be utilized and paths with high probability may be determined which may result in being able to proactively set preventative measures into motion. Simulated annealing may additionally be used to provide the option of having multiple start points for each generated path.

When used in analyzing contracts, additional application of various rules and deep learning optimizers may utilize the modeled paths to explore business strategies, portfolio designs, additional risk transfer options, change insurance contracts, and the like.

Dimensionality reduction 719 may entail the use of dimensionality reduction techniques such as t-Distributed Stochastic Neighbor Embedding (t-SNE), Self-Organizing Feature Maps (SOFM), and the like to plot and monitor non-geographic perils, such as cyber threats and assets. Areas like cyber assets may silently accumulate risk, which may potentially span over multiple years. Through proactive monitoring of metrics, such as Kerberos credentials, unmanageable risk accumulation may be avoided.

Dynamic micro-peril modeling 721 may entail analyzing possible events stemming from less severe perils. Dynamic micro-peril modeling 721 may be based on micro-peril modeling currently used in the art. However, with the tools provided by business operating system 100, tradition micro-peril modeling may be improved upon with added dynamism of advanced modeling, automatic model tuning, and vast amounts of gathered and generated data to analyze and sample from. During micro-peril analysis, preventative and response measures may be modeled, and may be communicated to relevant parties to aid in reducing loss accumulation.

Synthetically generated datasets 723 may be acquired through the use of advanced simulation and modeling tools provided by business operating system 100 to enrich the pool of data for use in analysis and model calibration. Models may be peril-specific or may encompass multiple perils. Along with the data gathering and analysis functions of business operating system 100, simulations may include information such as damage ratios, satellite imagery, news, weather information, rebuilding materials cost fluctuations, and the like.

In generating datasets, a user may specify a targeted accuracy to specify how many times a simulation may run. More accurate forecasts may be achieved with a greater number of simulation runs. When running multi-peril simulations, the user may specify target accuracy on a peril-by-peril basis, as well as be provide tools to allow inclusion of peril-specific data. The user may also be provided more granular controls to adjust various settings which may include, but is not limited to, parameterization intensity, number of seeds, look-ahead depth, branching factor, and the like. During an ongoing event, simulations may be dynamically triggered based on real-world occurrences; for example, models may be tuned to follow the real-world path of a hurricane. When processing multiple perils, priorities may be assigned for balancing time of simulation execution, cost of computation, model risk, urgency, and the like in order to meet business goals or adhere to regulations that may be in place.

Ground-up loss uncertainty modeling 725 may entail finding correlations as a result of modeling and analyzing ground up loss uncertainty for a certain area. Sampling while modeling ground up loss uncertainty for a particular location can be used for describing correlations between various populations and assets, as well as user-controllable correlations to local, regional, national, and global dynamics.

Contract risk modeling 727 may entail evaluation of real-world events and their effects on contractual interpretations using the data extraction on gathered data provided by business operating system 100. By keeping up-to-date on contractual interpretations, loss estimates in areas that were previously not covered, or had enough information for analysis, may be included in loss forecasts. This may be useful in areas currently undergoing rapid advances in technology, as well as areas where regulations are still being developed. Such areas may include, but is not limited to, cyber assets, internet-of-things, drones, autonomous vehicles, and the like.

From a business standpoint, the information gleaned from the various elements of system 700 may be used to more accurately forecast risks. This may not only help underwriters and actuaries to determine loss and premiums, but may be able to predict events and provide advanced warning to insureds to avoid property damage. It may also aid in determining whether a contract is a safe addition to a portfolio. In other embodiments, a marketplace or repository may be provided to enable easy distribution of various forecast models, datasets, event sets and the like.

Detailed Description of Exemplary Aspects

Figure 8:
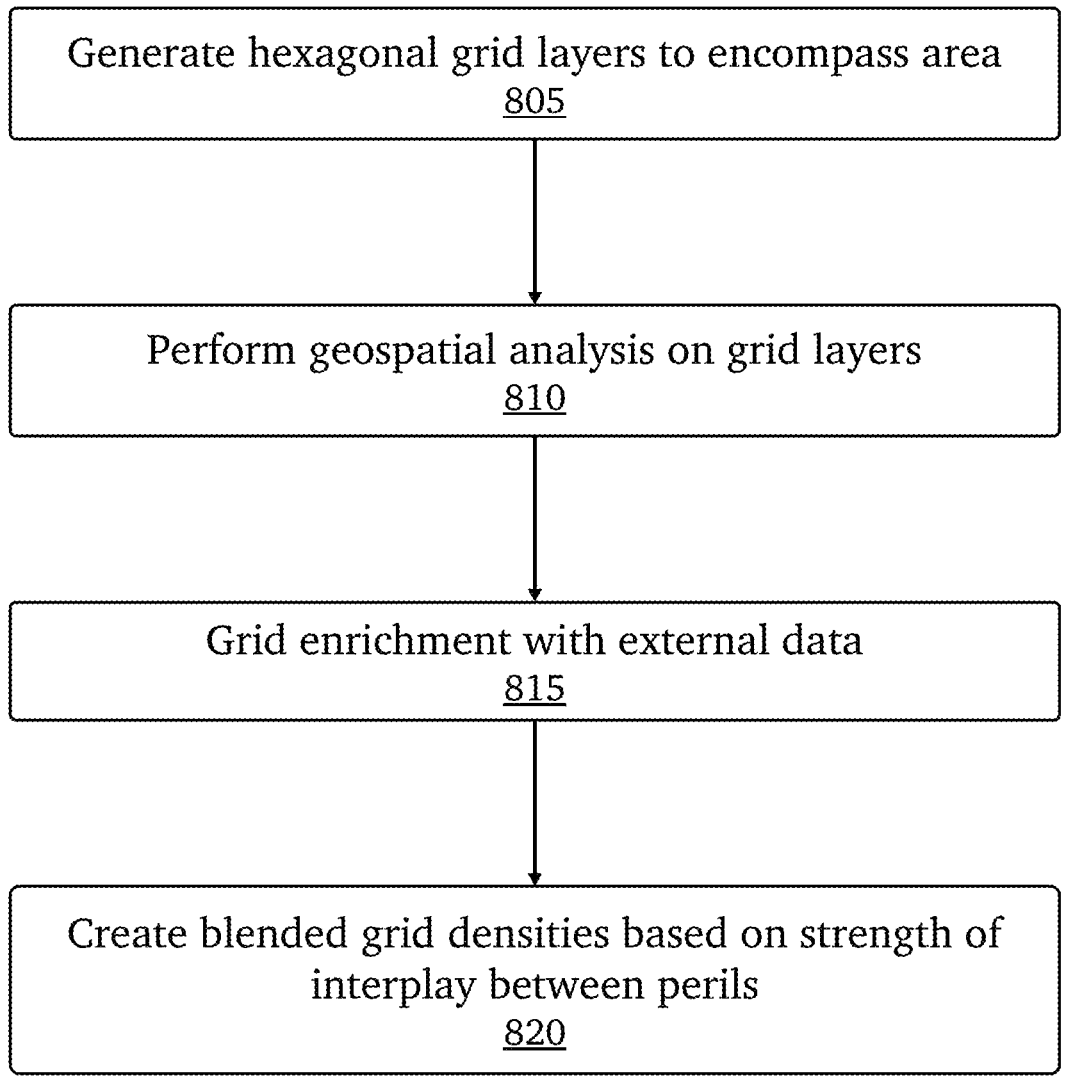
FIG. 8 is a flow chart illustrating a method for creating and utilizing a tessellated grid of cells for multi-peril modeling as used in various embodiments of the invention.

FIG. 8 is a flow chart illustrating a method 800 for creating and utilizing a tessellated grid of cells for multi-peril modeling as used in various embodiments of the invention. At an initial step 805, using the geospatial tools of business operating system 100, a hexagonal grid layer may be dynamically generated to encompass a geographic area. For denser areas, an efficient tree data structure may be used; for example, in an area with a denser placement of properties. Multiple layers may be generated and associated with a single peril, or a combination of perils. At step 810, geospatial analysis is performed on the grid layers. This may comprise performing simulations with either whole-grid data or cell-level data in order to forecast loss, and generate event sets based on the peril or perils in which the layer is associated with. At step 815, if required, business operating system 100 may be configured to use its data gathering functions, such as web crawler 115 and multidimensional time series data store 120, to gather data from external sources to further enrich the grid layers. Gathered data may include, but is not limited to, news, image analysis, location databases, and the like. At step 820, aggregation of two or more layers with regards to a peril of interest using layer conflation functions of the geospatial tools of business operating system 100. In the aggregation, layers may be factored in with varying levels of emphasis based on the strength of its association to the peril of interest.

Figure 9:
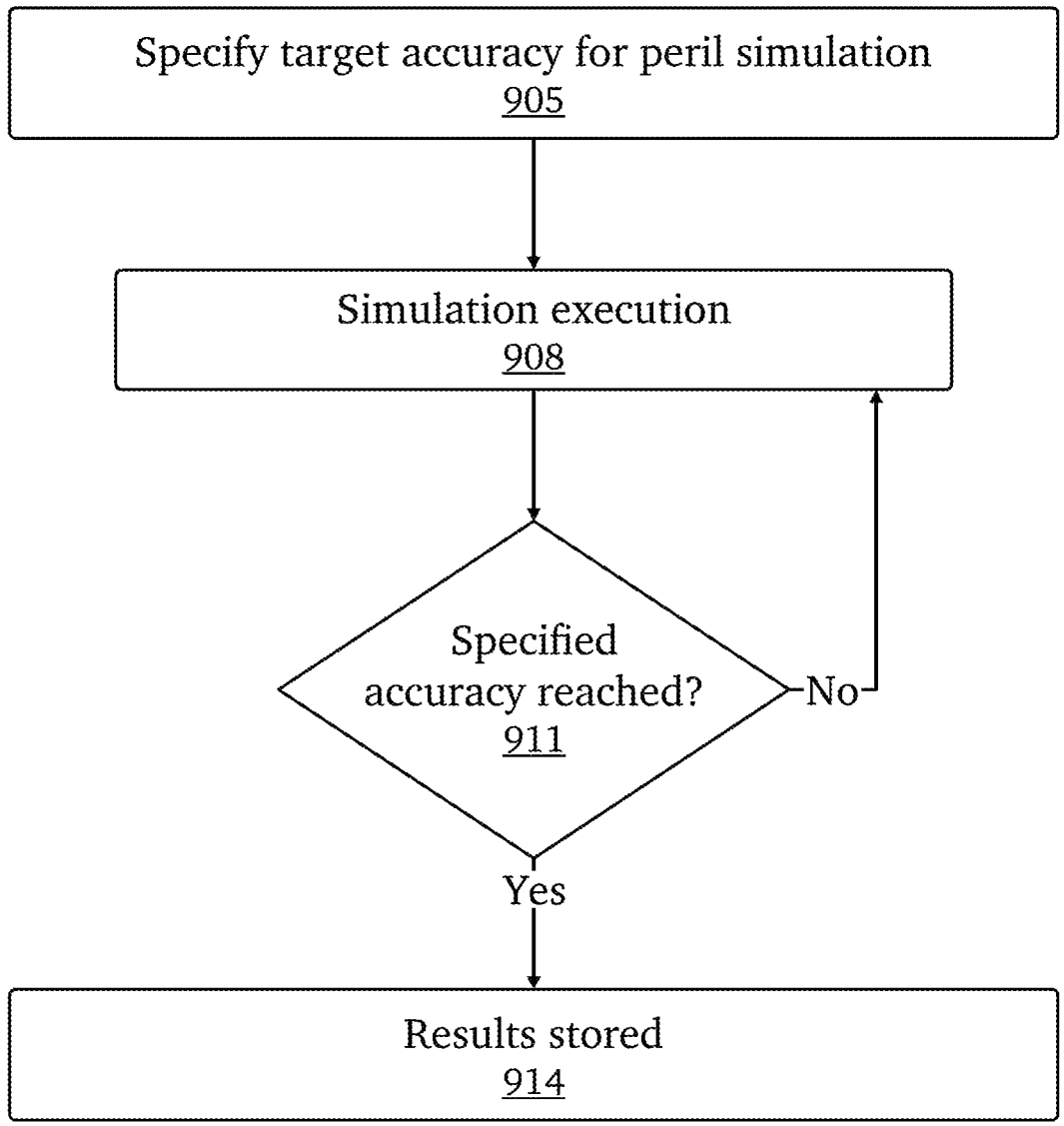
FIG. 9 is a flow chart illustrating a method for generating synthetic datasets as used in various embodiments of the invention.

FIG. 9 is a flow chart illustrating a method 900 for generating synthetic datasets as used in various embodiments of the invention. At an initial step 905, a user may specify a target accuracy for simulating a certain peril. If the user desires a high degree of accuracy, a greater number of simulation runs may be scheduled. The user may be provided with granular control over settings such as controlling parameterization intensity, number of seeds, and the like. At step 908, the simulation is executed. At step 911, if the number of runs determined by the target accuracy specified in step 905 has not been reached, the simulation is executed again. This loop cycles until the predetermined number of runs has been reached. Once the number of simulations as reached the prespecified number of runs, the simulation ends, and the results are stored to memory at step 914. At this point, if other simulations are scheduled, the system may move on to the next set of simulations.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 10:
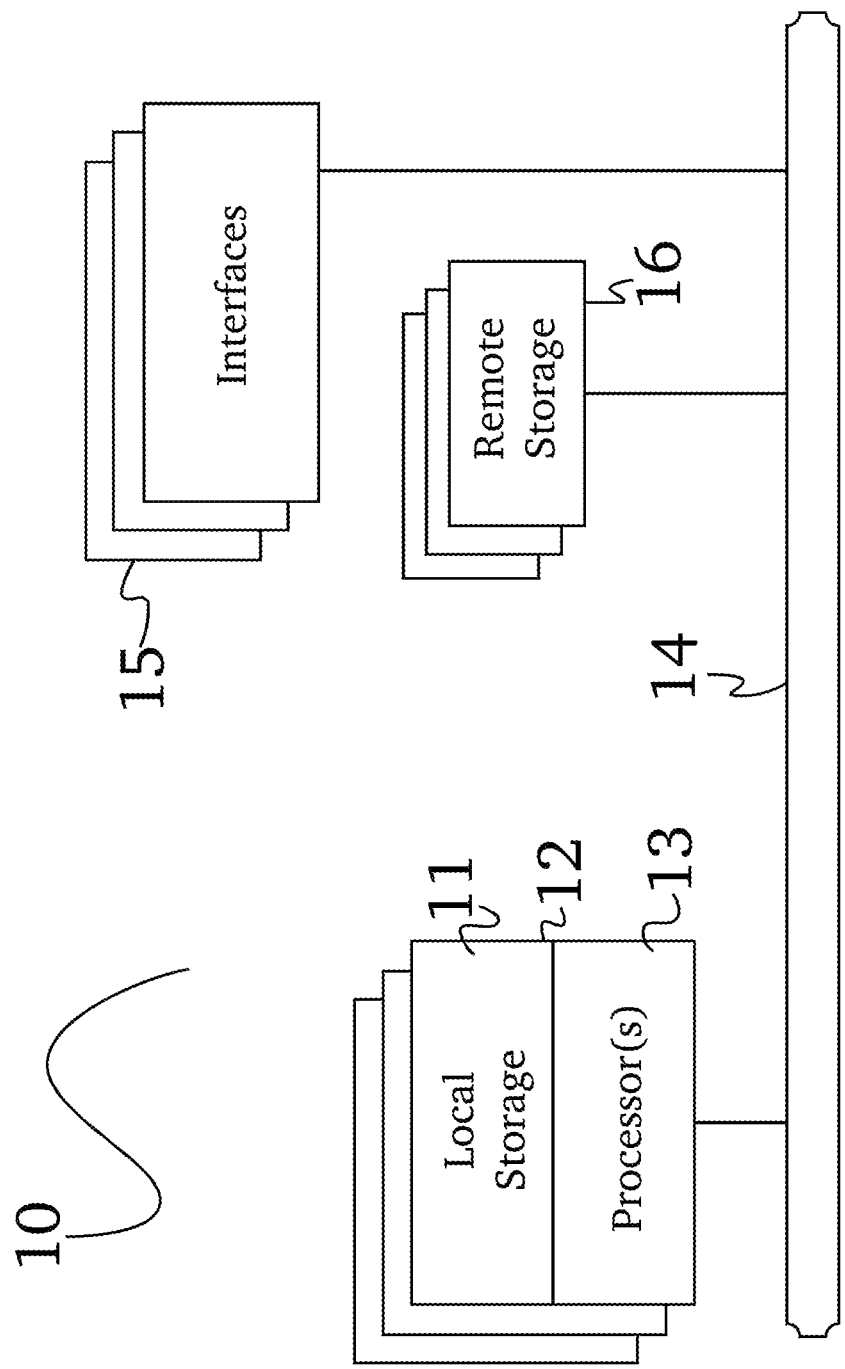
FIG. 10 is a block diagram illustrating an exemplary hardware architecture of a computing device used in various embodiments of the invention.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 10 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
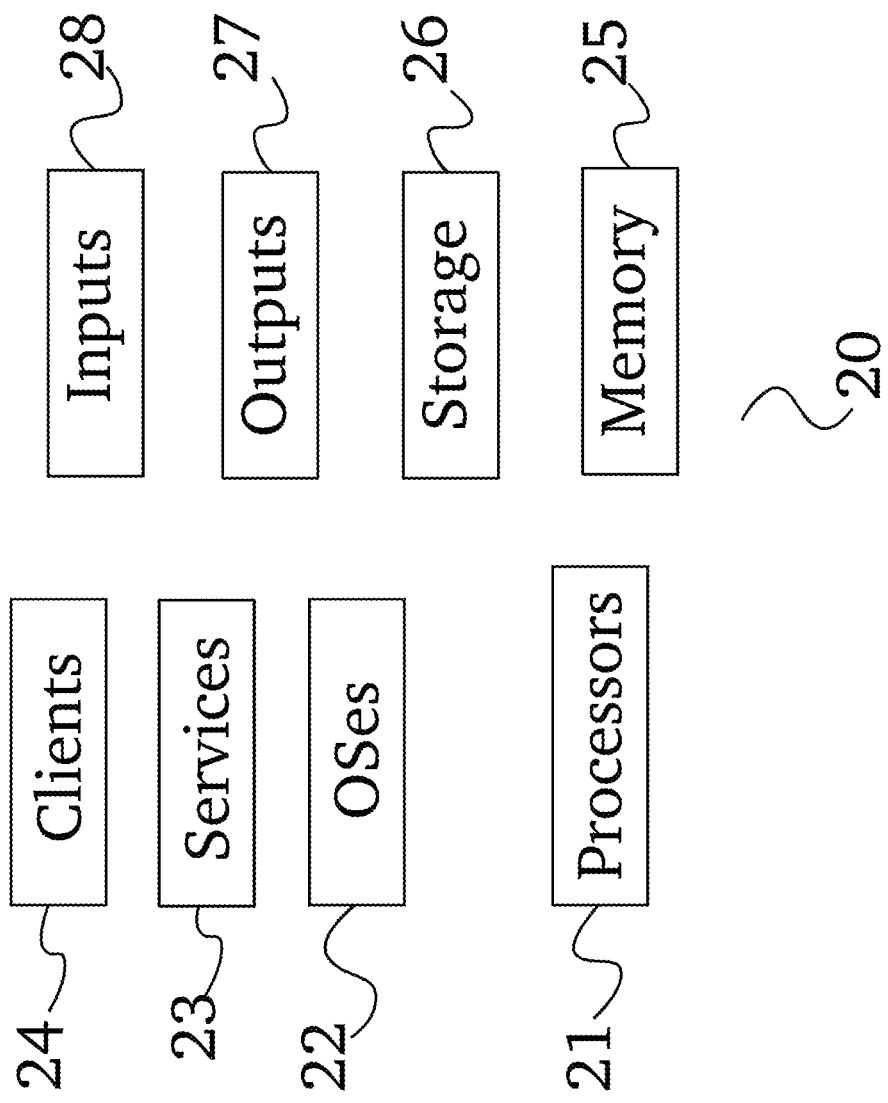
FIG. 11 is a block diagram illustrating an exemplary logical architecture for a client device, according to various embodiments of the invention.

In some aspects, systems may be implemented on a standalone computing system. Referring now to FIG. 11, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
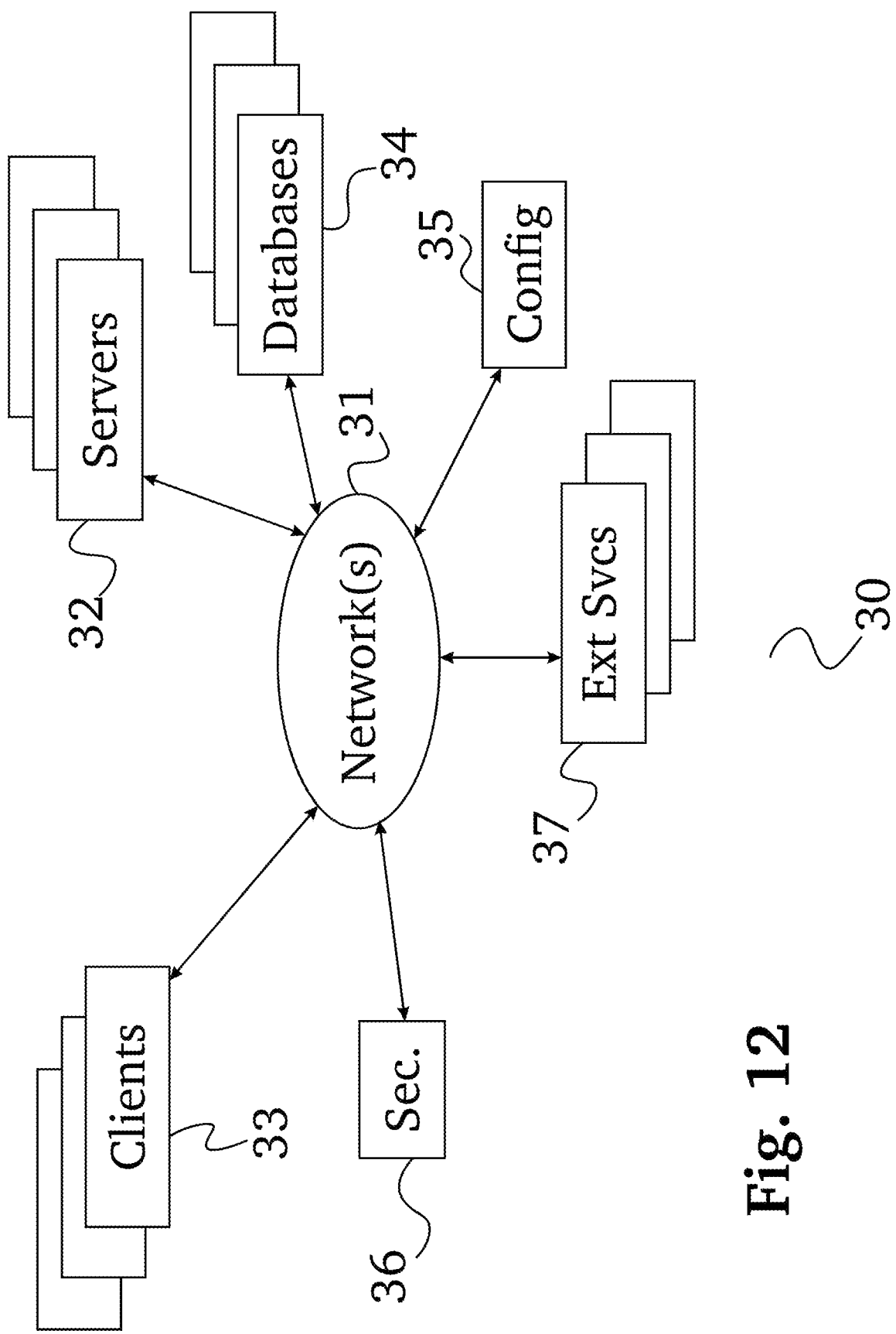
FIG. 12 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 12, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 11. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 13:
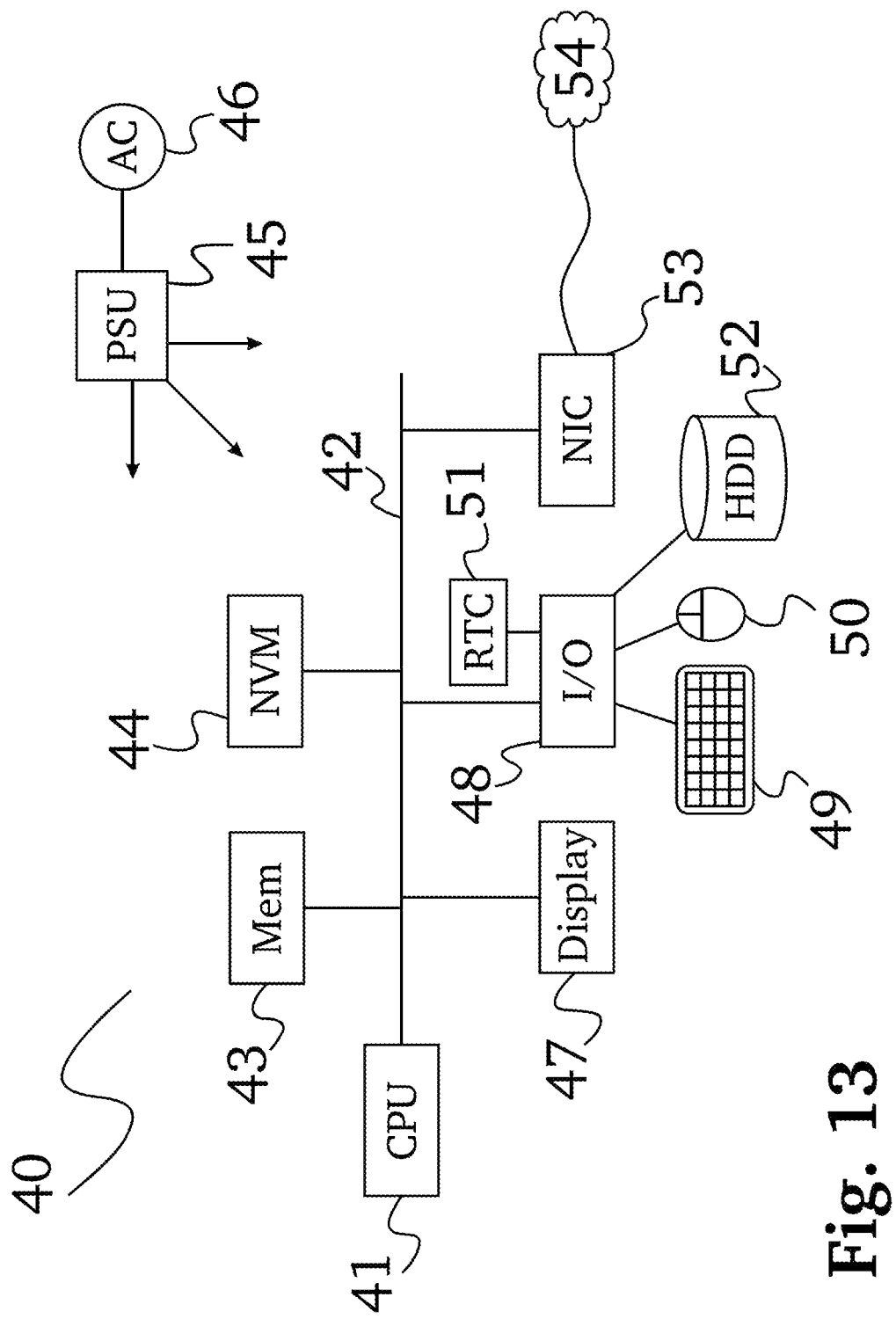
FIG. 13 is another block diagram illustrating an exemplary hardware architecture of a computing device used in various embodiments of the invention.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for modifying an insurance contract based on multi-peril catastrophe modeling using directed graphs and event linking, comprising:
    a plurality of computing devices each comprising at least a processor, a memory, and a network interface;
    wherein a plurality of programming instructions stored in one or more of the memories and operating on one or more of the processors of the plurality of computing devices causes the plurality of computing devices to:
        receive real-world insurance data, the real-world insurance data comprising a potential insurance loss and time series data for a plurality of risks that may lead to the potential insurance loss;
        create a first directed graph from the real-world insurance data, wherein the first directed graph comprises nodes representing events and edges representing a probability of one event occurring after another, the nodes and edges comprising a plurality of pathways from the plurality of risks to the insurance loss;
        receive a user-specified parameter for generation of simulated insurance data;
        generate simulated insurance data from probabilistic analyses of the real-world insurance data based on the user-specified parameter, wherein:
            the simulated insurance data comprises the potential insurance loss and time series data for a plurality of simulated risks that may lead to the potential insurance loss; and the probabilistic analyses used to generate the simulated insurance data comprise a Monte Carlo simulation for each of the plurality of simulated risks based on the potential insurance loss and time series data; and create a second directed graph comprising nodes representing events and edges representing a probability of one event occurring after another, the nodes and edges comprising a plurality of pathways from the simulated insurance data; and perform graph analysis on the first directed graph and second directed graph to find a pathway common to both graphs which leads to the potential insurance loss;

determine a risk associated with the common pathway based on the edge probabilities of the common pathway; and change an insurance premium of an insurance contract based on the risk.

2. The system of claim 1, further comprising the step of forecasting a probability of occurrence of the potential insurance loss based at least in part by the first directed graph, the second directed graph, and the common pathway.

3. The system of claim 1, wherein the real-world insurance data further comprises geographical information, and the graph analysis further comprises tessellated grid modeling to determine a geographical link between the first directed graph and second directed graph.

4. The system of claim 1, wherein the graph analysis further comprises path-dependency modeling to identify a pathway to the potential insurance loss with a specific metric.

5. The system of claim 1, the graph analysis further comprises a dimensionality reduction analysis to reduce the complexity of the graph analysis.

6. The system of claim 1, wherein the graph analysis further comprises dynamic micro-peril modeling to identify pathways that lead to alternate, less-severe losses than the potential insurance loss.

7. A method for modifying an insurance contract based on multi-peril catastrophe modeling using directed graphs and event linking, comprising the steps of:

receiving real-world insurance data, the real-world insurance data comprising a potential insurance loss and time series data for a plurality of risks that may lead to the potential insurance loss;

creating a first directed graph from the real-world insurance data, wherein the first directed graph comprises nodes representing events and edges representing a probability of one event occurring after another, the nodes and edges comprising a plurality of pathways from the plurality of risks to the insurance loss;

generating simulated insurance data from probabilistic analyses of the real-world insurance data based on the user-specified parameter, wherein:

the simulated insurance data comprises the potential insurance loss and time series data for a plurality of simulated risks that may lead to the potential insurance loss; and the probabilistic analyses used to generate the simulated insurance data comprise a Monte Carlo simulation for each of the plurality of simulated risks based on the potential insurance loss and time series data;

creating a second directed graph comprising nodes representing events and edges representing a probability of one event occurring after another, the nodes and edges comprising a plurality of pathways from the simulated insurance data;

performing graph analysis on the first directed graph and second directed graph to find a pathway common to both graphs which leads to the potential insurance loss;

determining a risk associated with the common pathway based on the edge probabilities of the common pathway; and changing an insurance premium of an insurance contract based on the risk.

8. The method of claim 7, further comprising the step of forecasting a probability of occurrence of the potential insurance loss based at least in part by the first directed graph, the second directed graph, and the common pathway.

9. The method of claim 7, wherein the real-world insurance data further comprises geographical information, and the graph analysis further comprises tessellated grid modeling to determine a geographical link between the first directed graph and second directed graph.

10. The method of claim 7, wherein the graph analysis further comprises path-dependency modeling to identify a pathway to the potential insurance loss with a specific metric.

11. The method of claim 7, the graph analysis further comprises a dimensionality reduction analysis to reduce the complexity of the graph analysis.

12. The method of claim 7, wherein the graph analysis further comprises dynamic micro-peril modeling to identify pathways that lead to alternate, less-severe losses than the potential insurance loss.

13. A computer-readable, non-transitory medium comprising a plurality of programming instructions that, when operating on a plurality of computing devices each comprising at least a processor, a memory, and a network interface, cause the plurality of computing devices to carry out the method of claim 7.

* * * * *